(12) United States Patent
Lin et al.

(10) Patent No.: US 9,924,285 B2
(45) Date of Patent: Mar. 20, 2018

(54) ADAPTER APPARATUS FOR HEADSET ACCESSORY AND SIGNAL TRANSFER METHOD OF HEADSET ACCESSORY

(71) Applicant: Merry Electronics(Shenzhen) Co., Ltd., Guangdong (CN)

(72) Inventors: Hung-Chi Lin, Taichung (TW); Syue-Yu Jhang, Taichung (TW); Mao-Hung Lin, Taichung (TW); Yi-Lin Hsieh, Taichung (TW)

(73) Assignee: Merry Electronics(Shenzhen) Co., Ltd., Guangdong (CN)

( * ) Notice: Subject to any disclaimer, the term of this patent is extended or adjusted under 35 U.S.C. 154(b) by 0 days.

(21) Appl. No.: 15/281,109

(22) Filed: Sep. 30, 2016

(65) Prior Publication Data

US 2018/0054685 A1    Feb. 22, 2018

(30) Foreign Application Priority Data

Aug. 22, 2016  (TW) .............................. 105126691 A

(51) Int. Cl.
*H04R 1/10*       (2006.01)
*H04R 29/00*      (2006.01)
*H04M 1/00*       (2006.01)

(52) U.S. Cl.
CPC ......... *H04R 29/001* (2013.01); *H04R 1/1091* (2013.01); *H04R 2420/03* (2013.01); *H04R 2420/09* (2013.01)

(58) Field of Classification Search
CPC .......... H04R 2201/107; H04R 2420/07; H04R 1/1041; H04R 2430/01; H04R 2420/09; H04R 5/033; H04R 1/1008; H04R 1/1016; H04R 2420/03; H04R 2420/05; H04R 2499/11; H04R 25/50; H04R 5/04; H04R 29/001; H04R 1/1091; H04M 1/72527; H04M 1/6033; H04M 1/6058; H04M 1/6066; H04M 3/568; G06F 3/165; H04S 2400/13; H04S 2400/15
USPC .............. 381/74, 107, 384, 56, 71.6, 77, 98; 379/420.04, 430, 447
See application file for complete search history.

(56) References Cited

U.S. PATENT DOCUMENTS

| | | | | |
|---|---|---|---|---|
| 5,226,077 A | * | 7/1993 | Lynn .................... | H04M 1/6033 379/214.01 |
| 2009/0180642 A1 | * | 7/2009 | Sander ................... | H04M 1/05 381/109 |
| 2010/0115149 A1 | * | 5/2010 | Ewer ................... | H04M 1/6066 710/19 |

* cited by examiner

*Primary Examiner* — Norman Yu
(74) *Attorney, Agent, or Firm* — Jciprnet

(57) ABSTRACT

An adapter apparatus for a headset accessory and a signal transfer method of the headset accessory are provided. The adapter apparatus includes an earphone jack, a connection interface and a device adapter circuit. The earphone jack is suitable for a plug of the headset accessory to plug in. The connection interface is suitable for being electrically connected with a portable device. The device adapter circuit is electrically connected to the earphone jack and the connection interface to receive a headset control signal of the headset accessory and provide a device control signal to the portable device via the connection interface. The device adapter circuit provides the device control signal based on a DC level and a frequency of the headset control signal.

10 Claims, 4 Drawing Sheets

ADAPTER APPARATUS FOR HEADSET ACCESSORY AND SIGNAL TRANSFER METHOD OF HEADSET ACCESSORY

CROSS-REFERENCE TO RELATED APPLICATIONS

This application claims the priority benefit of Taiwan Patent Application No. 105126691, filed on Aug. 22, 2016. The entirety of the above-mentioned patent application is hereby incorporated by reference herein and made a part of this specification.

BACKGROUND

Field of the Invention

The invention is directed to an adapter apparatus and more particularly, to an adapter apparatus for a headset accessory and a signal transfer method of the headset accessory.

Description of Related Art

Due to tight pace of life, various portable devices that can be conveniently carried have been continuously developed, and designs of the portable devices trend toward light and thin. In the trend toward light and thin, the 3.5 mm earphone jack will be replaced by jacks of other types, such as a lighting jack developed by Apple Inc. or a universal serial bus (USB) jack. Meanwhile, when a headset accessory (e.g., an earphone or a headset) provided with a line control function is coupled to a portable device through an adapter, the headset accessory may only function in audio playback, and may not performing control operations (e.g., start playback, stop playback, pause playback, volume up, volume down, and so on) on the portable device, which leads to influence on the use convenience of the headset accessory.

SUMMARY

The invention provides an adapter apparatus for a headset accessory and a signal transfer method of the headset accessory, capable of connecting the headset accessory with the portable device successfully, without affecting a line control function of the headset accessory.

An adapter apparatus of the invention includes an earphone jack, a connection interface and a device adapter circuit. The earphone jack is suitable for a plug of the headset accessory to plug in. The connection interface is suitable for being electrically connected with a portable device. The device adapter circuit is electrically connected to the earphone jack and the connection interface to receive a headset control signal of the headset accessory and provide a device control signal to the portable device via the connection interface. The device adapter circuit includes a signal extractor, a potential detector and a signal comparison module. The signal extractor receives the headset control signal to determine a frequency of the headset control signal and correspondingly provide a frequency determination signal. The potential detector receives the headset control signal to determine a direct current (DC) level of the headset control signal and correspondingly provide a level determination signal. The signal comparison module is coupled to the signal extractor and the potential detector to provide the device control signal according to the frequency determination signal and the level determination signal.

A signal transfer method of a headset accessory of the invention is adapted to an adapter apparatus for a headset accessory. The adapter apparatus for the headset accessory is electrically connected to a headset accessory and a portable device. The signal transfer method includes the following steps. A headset control signal of the headset accessory is received by a device adapter circuit. A frequency of the headset control signal is determined, and a frequency determination signal is correspondingly provided by a signal extractor of the device adapter circuit. A DC level of the headset control signal is determined, and a level determination signal is correspondingly provided by a potential detector of the device adapter circuit. The device control signal is provided to the portable device according to the frequency determination signal and the level determination signal by a signal comparison module of the device adapter circuit.

To sum up, in the adapter apparatus for the headset accessory and the signal transfer method of the headset accessory provided by the embodiments of the invention, the frequency and the DC level of the headset control signal provided by the headset accessory is determined to determine the control function corresponding to the headset control signal and provide the corresponding device control signal to the portable device according to the control function corresponding to the headset control signal. Thereby, the adapter apparatus for the headset accessory can adapt to different signal modes to determine the control function corresponding to the headset control signal, such that the line control function of the headset accessory can still be normally used.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
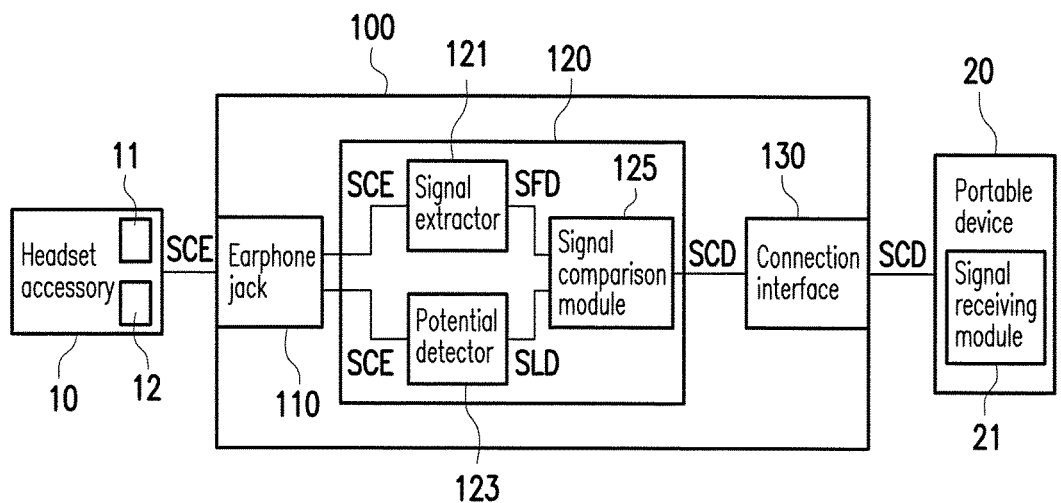
FIG. 1 is a schematic system diagram showing an adapter apparatus for a headset accessory according to an embodiment of the invention.

FIG. 1 is a schematic system diagram showing an adapter apparatus for a headset accessory according to an embodiment of the invention. Referring to FIG. 1, in the present embodiment, a headset accessory adapter apparatus 100 is coupled to a headset accessory 10 and a portable device 20 to convert a headset control signal SCE of the headset accessory 10 into a device control signal SCD and then transmit it to the portable device 20. The headset accessory 10 may have at least one line-control button (e.g., 11 and/or 12) to provide the headset control signal SCE. The headset accessory 10 is, for example, an earphone or a headset. The portable device 20 includes a signal receiving module 21 to receive the device control signal SCD provided by the headset accessory adapter apparatus 100. The portable device 20 is, for example, a cell phone or a tablet computer.

The headset accessory adapter apparatus 100 includes an earphone jack 110, a device adapter circuit 120 and a connection interface 130. The earphone jack 110 is suitable for a plug of the headset accessory 10 to plug in, so as to be connected to the headset accessory adapter apparatus 100 and the headset accessory 10 and receive the headset control signal SCE provided by the headset accessory 10. The connection interface 130 is suitable for being electrically connected with a signal receiving module 21 of the portable device 20. The device adapter circuit 120 is electrically connected to the earphone jack 110 and the connection interface 130 to receive the headset control signal SCE of the headset accessory 10 via the earphone jack 110 and provide the device control signal SCD to the signal receiving module 21 of the portable device 20 via the connection interface 130 after obtaining the corresponding device control signal SCD according to the headset control signal SCE of the headset accessory 10.

In the present embodiment, the device adapter circuit 120 includes a signal extractor 121, a potential detector 123 and a signal comparison module 125. The signal extractor 121 receives the headset control signal SCE to determine a frequency of the headset control signal SCE and correspondingly provide a frequency determination signal SFD. The potential detector 123 receives the headset control signal SCE to determine a direct current (DC) level of the headset control signal SCE and correspondingly provide a level determination signal SLD. The signal comparison module 125 is coupled to the signal extractor 121 and the potential detector 123 to provide the device control signal SCD according to the frequency determination signal SFD and the level determination signal SLD.

Furthermore, the signal comparison module 125 determines a control function providing the headset control signal SCE according to the frequency determination signal SFD and the level determination signal SLD and provides the device control signal SCD corresponding to the control function. An example is provided below to describe that the headset control signal SCE is set in different manners for Apple and Android camps. In other words, the headset control signal SCE for the Apple camp may include a DC level or a tone signal, while the headset control signal SCE for the Android camp may include only the DC level.

TABLE 1

| Control function | Apple | Android |
| --- | --- | --- |
| Play/Pause | 0 V bias | 0 V bias |
| Volume up | Tone signal 165 to 175 Hz | 0.2 to 0.256 V bias |
| Volume down | Tone signal 130 to 140 Hz | 0.309 to 0.519 V bias |

According to the above setting, the headset control signal SCE may be transmitted by the headset accessory 10 of the Apple camp or the Android camp when the frequency determination signal SFD indicates that the headset control signal SCE does not include the tone signal, while the headset control signal SCE should be transmitted by the headset accessory 10 of the Apple camp when the frequency determination signal SFD indicates that the headset control signal SCE includes the tone signal. Then, according to signal characteristics of the headset control signal SCE of the Apple camp or the Android camp (which are illustrated in Table 1), the control function represented by the headset control signal SCE can be identified.

In the embodiments of the invention, the headset accessory adapter apparatus 100 is connected to the portable device 20 in a wired or a wireless manner. Namely, the connection interface 130 is a wired or a wireless connection interface. When the connection interface 130 is a wired connection interface, the signal comparison module 125 provides the device control signal SCD corresponding to the control function of the headset control signal SCE according to a human interface device (HID) profile. When the connection interface 130 is a wireless connection interface, the signal comparison module 125 provides the device control signal SCD corresponding to the control function of the headset control signal SCE according to an HID profile or an audio video remote control profile (AVRCP). Therein, the wired connection interface is, for example, a universal serial bus (USB) interface, and the wireless connection interface is, for example, a Bluetooth interface or a wireless fidelity (WiFi) interface.

Figure 2:
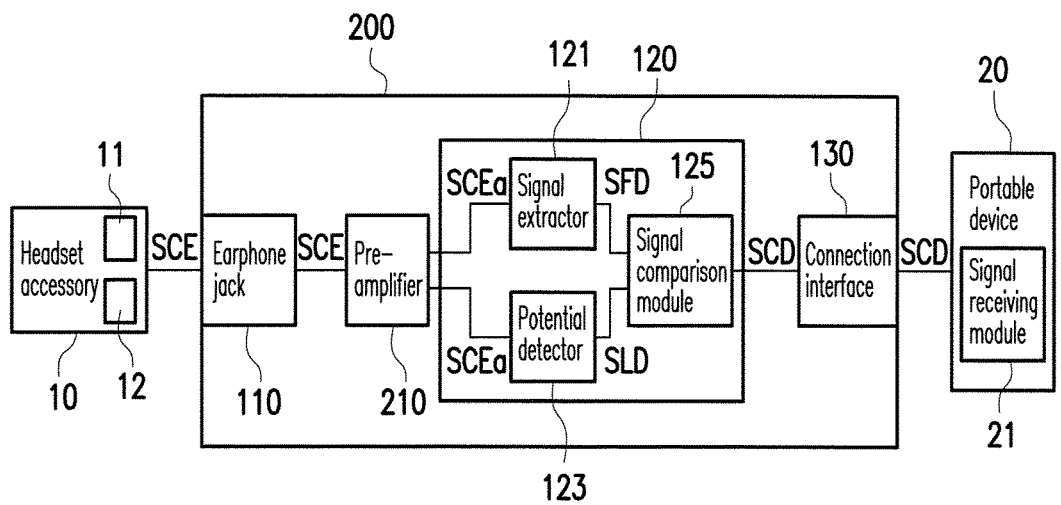
FIG. 2 is a schematic system diagram showing an adapter apparatus for a headset accessory according to another embodiment of the invention.

FIG. 2 is a schematic system diagram showing an adapter apparatus for a headset accessory according to another embodiment of the invention. Referring to FIG. 1 and FIG. 2, a headset accessory adapter apparatus 200 is substantially similar to the headset accessory adapter apparatus 100, and a difference therebetween lies in the headset accessory adapter apparatus 200 further including a pre-amplifier 210. In the present embodiment, the pre-amplifier 210 is configured to amplify the headset control signal SCE and suppress noise in the headset control signal SCE. In other words, the pre-amplifier 210 is coupled to the earphone jack 110 to receive the headset control signal SCE and provide an amplified headset control signal SCEa to the device adapter circuit 120 for the signal extractor 121 and the potential detector 123 to perform a signal sampling operation.

Figure 3:
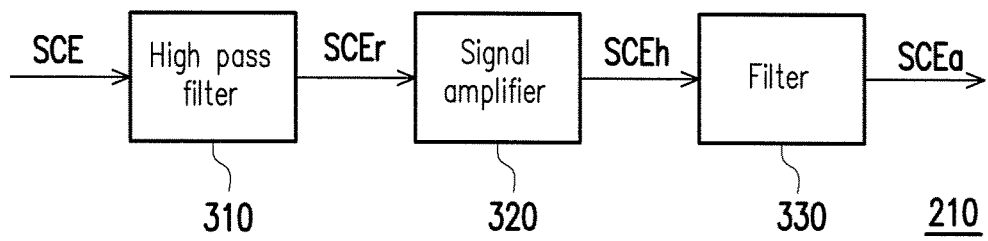
FIG. 3 is a schematic system diagram showing a pre-amplifier according to an embodiment of the invention.

FIG. 3 is a schematic system diagram showing a pre-amplifier according to an embodiment of the invention. Referring to FIG. 2 and FIG. 3, in the present embodiment, the pre-amplifier 210 includes a high pass filter 310, a signal amplifier 320 and a filer 330. The high pass filter 310 receives the headset control signal SCE to provide a control reference signal SCEr. The signal amplifier 320 is coupled to the high pass filter 310 to receive the control reference signal SCEr and provide an enhanced control signal SCEh. The filter 330 is coupled to the high pass filter 320 to receive the enhanced control signal SCEh and provide an amplified control signal SCEa.

Figure 4:
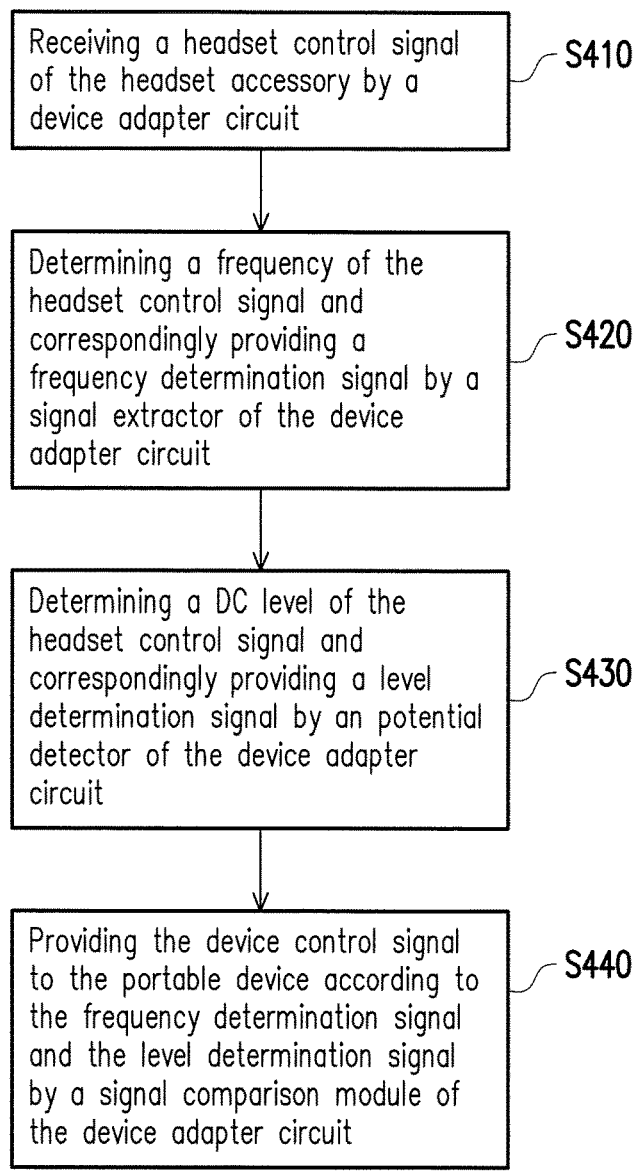
FIG. 4 is a flowchart of a signal transfer method of a headset accessory according to an embodiment of the invention.

FIG. 4 is a flowchart of a signal transfer method of a headset accessory according to an embodiment of the invention. Referring to FIG. 4, in the present embodiment, the signal transfer method of a headset accessory includes the following steps. In step S410, a headset control signal of the headset accessory is received by a device adapter circuit. In step S420, a frequency of the headset control signal is determined, and a frequency determination signal is correspondingly provided by a signal extractor of the device adapter circuit. In step S430, a DC level of the headset control signal is determined, and a level determination signal is correspondingly provided by a potential detector of the device adapter circuit. Lastly, in step S440, a device control signal is provided to a portable device according to the frequency determination signal and the level determination signal by a signal comparison module of the device adapter circuit. The sequence of steps S410, S420, S430 and S440 are merely for the purpose of illustration, but the invention is not limited thereto. In the meantime, details of steps S410, S420, S430 and S440 may refer to the description with respect to the embodiments illustrated in FIG. 1 and FIG. 3, and will not repeated hereinafter.

Figure 5:
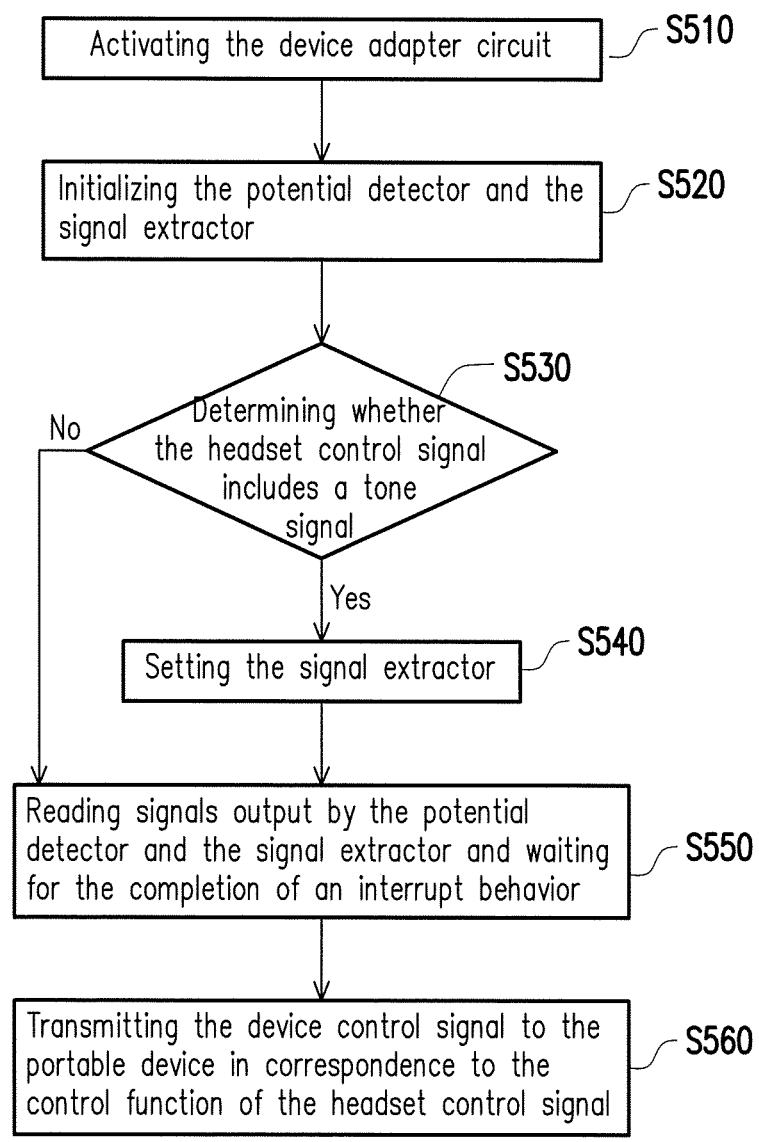
FIG. 5 is a flowchart of an operation method of the device adapter circuit according to an embodiment of the invention.

FIG. 5 is a flowchart of an operation method of the device adapter circuit according to an embodiment of the invention. Referring to FIG. 1 and FIG. 5, in the embodiment of the invention, the device adapter circuit 120 may be implemented in a circuit-only configuration (e.g., an application specified integrated circuit (ASIC)), or may be implemented in a configuration of hardware in combination with a program (e.g., a micro-controller).

The device adapter circuit 120 in the present embodiment is implemented by, for example, a micro-controller. The signal extractor 121 includes, for example, a fast Fourier transform (FFT) processor and a frequency decoder, and the potential detector 123 includes, for example, an analog-to-digital converter. Meanwhile, in the micro-controller, the hardware circuit (e.g., the FFT processor, the frequency decoder and the analog-to-digital converter) commonly calls through an interrupt flag.

In the present embodiment, an operation method of the device adapter circuit 120 includes the following steps. In step S510, the device adapter circuit is activated. In step S520, the potential detector 123 and the signal extractor 121 are initialized to enable basic functions of the potential detector 123 and the signal extractor 121, thereby determining the frequency and the DC level of the headset control signal SCE. In step S530, whether the headset control signal SCE includes a tone signal is determined according to the frequency and the DC level of the headset control signal SCE.

When the headset control signal SCE includes the tone signal, i.e., the determination result of step S530 is "yes", it represents that a more complicated sampling operation has to be performed on the headset control signal SCE by the signal extractor 121. Then, in step S540, the signal extractor 121 is set to completely activate the signal extractor 121. In step S550, signals output by the potential detector 123 and the signal extractor 121 are read, and the completion of an interrupt behavior is waited.

When the headset control signal SCE does not include the tone signal, i.e., the determination result of step S530 is "no", it represents that no complicated sampling operation has to be performed on the headset control signal SCE by the signal extractor 121. Thus, step S540 is skipped, and step S550 is directly performed.

In step S560, a control function corresponding to the headset control signal SCE is obtained according to the signals output by the potential detector 123 and the signal extractor 121. Then, the device control signal SCD is transmitted to the portable device 20 in correspondence to the control function of the headset control signal SCE.

Figure 6:
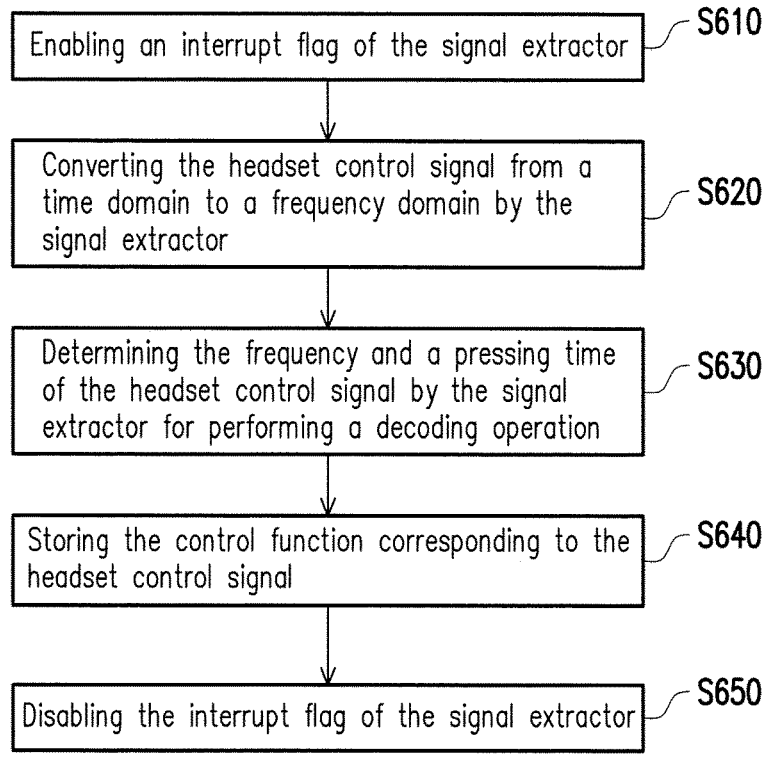
FIG. 6 is a flowchart of an interrupt behavior of the signal extractor according to an embodiment of the invention.

FIG. 6 is a flowchart of an interrupt behavior of the signal extractor according to an embodiment of the invention. Referring to FIG. 1, FIG. 5 and FIG. 6, in the present embodiment, an interrupt behavior of the signal extractor 121 includes the following steps. In step S610, an interrupt flag of the signal extractor 121 is enabled. In step S620, the headset control signal SCE is converted from a time domain to a frequency domain by the signal extractor 121. In step S630, the frequency and a pressing time of the headset control signal SCE are determined by the signal extractor 121 for performing a decoding operation. In step S640, the control function corresponding to the headset control signal SCE is stored. In step S650, the interrupt flag of the signal extractor 121 is disabled.

Figure 7:
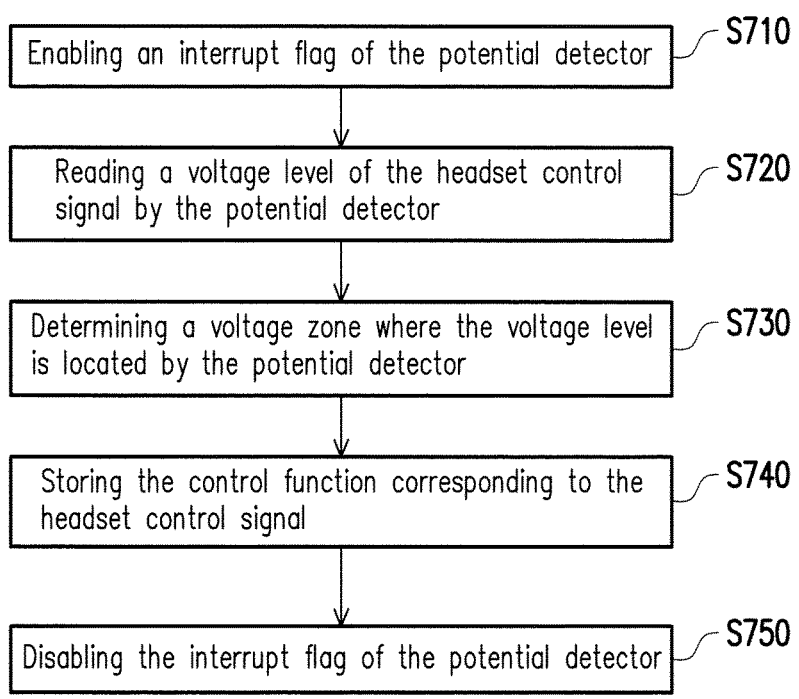
FIG. 7 is a flowchart of an interrupt behavior of the potential detector according to an embodiment of the invention.

FIG. 7 is a flowchart of an interrupt behavior of the potential detector according to an embodiment of the invention. Referring to FIG. 1, FIG. 5 and FIG. 7, in the present embodiment, an interrupt behavior of the potential detector 123 includes the following steps. In step S710, an interrupt flag of the potential detector 123 is enabled. In step S720, a voltage level of the headset control signal SCE is read by the potential detector 123. In step S730, a voltage zone where the voltage level is located is determined by the potential detector 123. In step S740, the control function corresponding to the headset control signal SCE is stored. In step S750, the interrupt flag of the potential detector 123 is disabled.

Based on the above, in the headset accessory adapter apparatus and the signal transfer method of the headset accessory provided by the embodiments of the invention, the frequency and the DC level of the headset control signal provided by the headset accessory is determined to determine the control function corresponding to the headset control signal and provide the corresponding device control signal to the portable device according to the control function corresponding to the headset control signal. Thereby, the headset accessory adapter apparatus can adapt to different signal modes to determine the control function corresponding to the headset control signal, such that the line control function of the headset accessory can still be normally used.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. An adapter apparatus for a headset accessory, comprising:
    an earphone jack, suitable for a plug of the headset accessory to plug in;
    a connection interface, suitable for being electrically connected with a portable device;
    a pre-amplifier, coupled to the earphone jack to receive a headset control signal of the headset accessory and provide an amplified headset control signal; and
    a device adapter circuit, electrically connected to the pre-amplifier and the connection interface to receive the amplified headset control signal of the headset accessory and provide a device control signal to the portable device via the connection interface, wherein the device adapter circuit comprises:
        a signal extractor, receiving the amplified headset control signal to determine a frequency of the amplified headset control signal and correspondingly provide a frequency determination signal;
        a potential detector, receiving the amplified headset control signal to determine a direct current (DC) level of the amplified headset control signal and correspondingly provide a level determination signal; and
        a signal comparison module, coupled to the signal extractor and the potential detector to provide the device control signal according to the frequency determination signal and the level determination signal, wherein the pre-amplifier comprises:
- a high pass filter, receiving the headset control signal to provide a control reference signal;
- a signal amplifier, coupled to the high pass filter to receive the control reference signal and provide an enhanced control signal; and
- a filter, coupled to the signal amplifier to receive the enhanced control signal and provide the amplified headset control signal to the device adapter circuit.

2. The adapter apparatus for the headset accessory according to claim 1, wherein the signal comparison module determines a control function of the headset control signal according to the frequency determination signal and the level determination signal, so as to provide the device control signal corresponding to the control function.

3. The adapter apparatus for the headset accessory according to claim 2, wherein when the connection interface is a wired connection interface, the signal comparison module provides the device control signal corresponding to the control function according to a human interface device (HID) profile.

4. The adapter apparatus for the headset accessory according to claim 3, wherein the wired connection interface is a universal serial bus (USB) interface.

5. The adapter apparatus for the headset accessory according to claim 2, wherein when the connection interface is a wireless connection interface, the signal comparison module provides the device control signal corresponding to the control function according to an HID profile or an audio video remote control profile (AVRCP).

6. The adapter apparatus for the headset accessory according to claim 5, wherein the wireless connection interface is a Bluetooth interface or a wireless fidelity (WiFi) interface.

7. The adapter apparatus for the headset accessory according to claim 1, wherein the headset accessory comprises at least one line-control button to provide the headset control signal.

8. The adapter apparatus for the headset accessory according to claim 1, wherein the portable device comprises a signal receiving module coupled to the device adapter circuit to receive the device control signal provided by the device adapter circuit.

9. A signal transfer method of a headset accessory, adapted to an adapter apparatus for the headset accessory, wherein the adapter apparatus for the headset accessory is electrically connected to a headset accessory and a portable device, the signal transfer method comprising:
- receiving a headset control signal of the headset accessory by a pre-amplifier and provide an amplified headset control signal;
- receiving the amplified headset control signal of the headset accessory by a device adapter circuit;
- determining a frequency of the amplified headset control signal and correspondingly provide a frequency determination signal by a signal extractor of the device adapter circuit;
- determining a direct current (DC) level of the amplified headset control signal and correspondingly provide a level determination signal by a potential detector of the device adapter circuit; and
- providing a device control signal to the portable device according to the frequency determination signal and the level determination signal by a signal comparison module of the device adapter circuit, wherein the pre-amplifier comprises:
- a high pass filter, receiving the headset control signal to provide a control reference signal,
- a signal amplifier, coupled to the high pass filter to receive the control reference signal and provide an enhanced control signal; and
- a filter, coupled to the signal amplifier to receive the enhanced control signal and provide the amplified headset control signal to the device adapter circuit.

10. The signal transfer method according to claim 9, wherein the step of providing the device control signal according to the frequency determination signal and the level determination signal comprises:
- determining a control function of the headset control signal according to the frequency determination signal and the level determination signal by the signal comparison module; and
- providing the device control signal corresponding to the control function by the signal comparison module.

* * * * *